United States Patent [19]
Chatwin et al.

[11] Patent Number: 5,091,895
[45] Date of Patent: Feb. 25, 1992

[54] TIMING APPARATUS

[75] Inventors: Ian M. Chatwin, South Caulfield; Allan R. Hines, Mulgrave, both of Australia

[73] Assignee: Dorian Industries Pty. Ltd., Australia

[21] Appl. No.: 654,652

[22] PCT Filed: Aug. 8, 1989

[86] PCT No.: PCT/AU89/00338
§ 371 Date: Feb. 8, 1991
§ 102(e) Date: Feb. 8, 1991

[87] PCT Pub. No.: WO90/01752
PCT Pub. Date: Feb. 22, 1990

[30] Foreign Application Priority Data
Aug. 12, 1988 [AU] Australia .................. PI9807

[51] Int. Cl.5 .................. G04F 8/00; G04B 47/00
[52] U.S. Cl. ........................................ 368/6; 368/9; 368/10; 340/323 R
[58] Field of Search .......... 368/1, 2, 3, 6, 9, 10; 377/20; 340/323 R; 343/711–716

[56] References Cited
U.S. PATENT DOCUMENTS

| | | | |
|---|---|---|---|
| 3,829,869 | 8/1974 | Balko et al. | 346/107 |
| 3,846,704 | 11/1974 | Bessette | 368/10 |
| 4,074,117 | 2/1978 | De Lorean et al. | 346/323 R |
| 4,551,725 | 1/1985 | Schaffer | 343/6.55 S |
| 4,643,585 | 2/1987 | Hillesland | 368/9 |

Primary Examiner—Vit W. Miska
Attorney, Agent, or Firm—Andrus, Sceales, Starke & Sawall

[57] ABSTRACT

An electronic timing apparatus for determining precisely when vehicles pass over a particular line on a road, particularly a race track (20), has a series of separate loop antennas (26), arranged in closely adjacent relationship one to another across the width of the track. Each vehicle (81,82) is fitted with a transmitter (28) for transmitting a unique identifying signal which is received by a loop antenna as the vehicle passes over the line. The width (x) of the antenna loops relative to the width of the vehicles is such that only one transmitter (28) can pass over a particular loop at the one time whereby when two or more vehicles cross the line simultaneously, signals from the respective transmitters are received in different antennas. A respective receiver module (27) is connected to each antenna loop and processes the identifying signal which is then fed to a micro-controlled (43) which calculates the time at which the particular vehicle crossed the line. A supervisory computer (24) collates and provides a database of timing information.

11 Claims, 4 Drawing Sheets

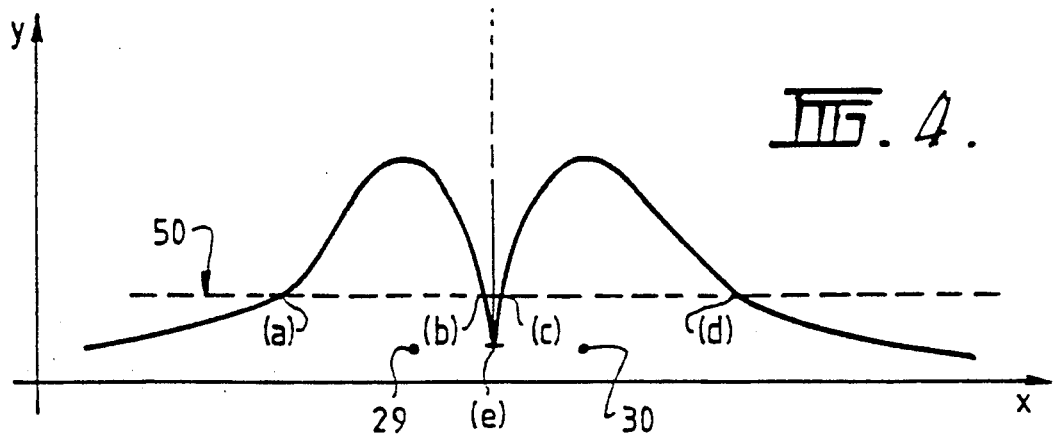
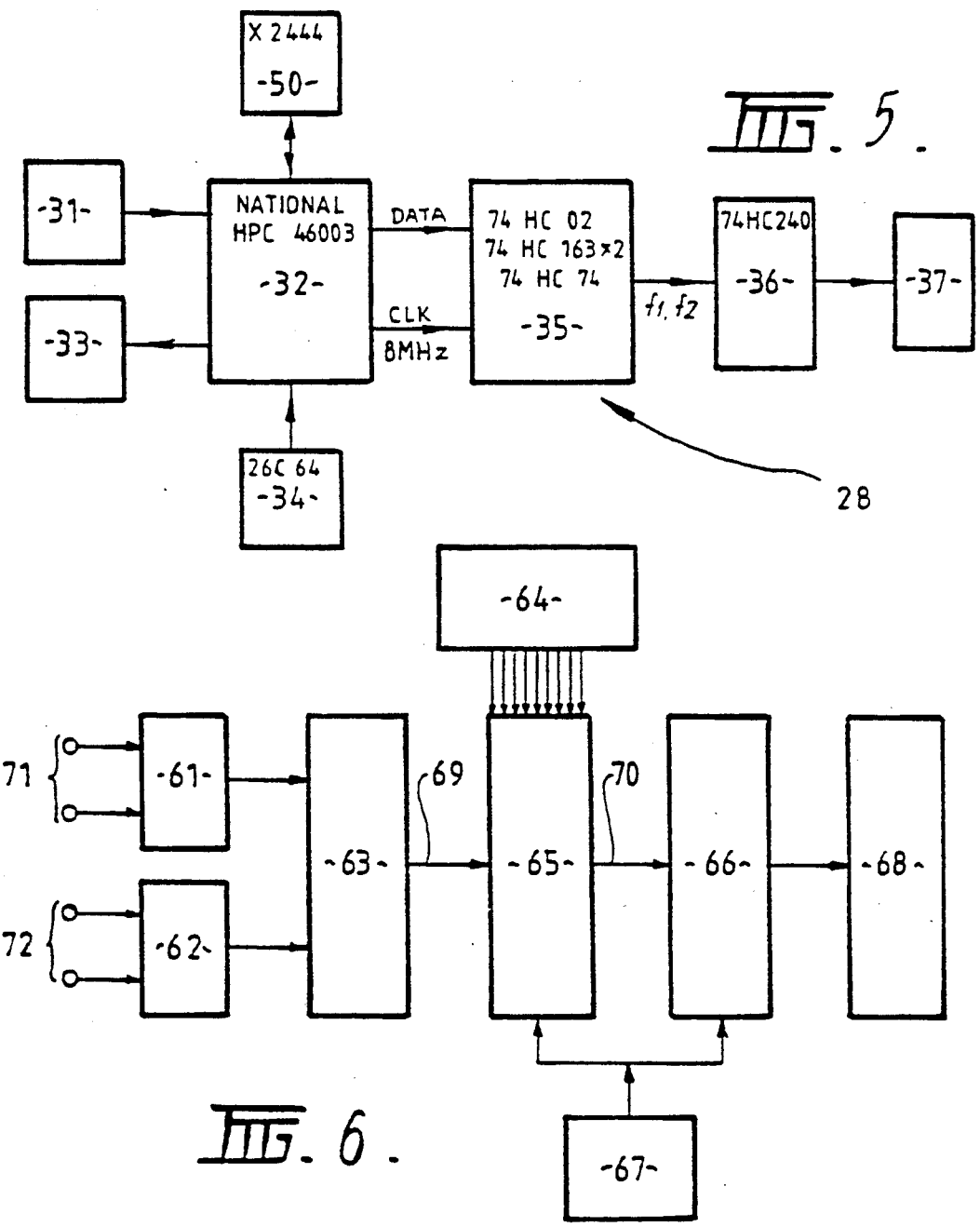

TIMING APPARATUS

This invention relates to a timing apparatus and more particularly to a timing apparatus for calculating the times at which vehicles pass over a line. The invention has particular utility in recording individual lap counts and calculating lap times where a number of vehicles circulate around a closed circuit or track such as in a motor car or motorcycle race.

Motor races have traditionally been timed by manual means, employing considerable numbers of people using stopwatches with resultant, inevitable inaccuracies. Accurate results for individual vehicles have been attainable by various electronic means, including the use of light or laser beams and these are commonly used for time trials to establish grid positions. Another method has been to employ individual transmitters installed in each vehicle with multiple receivers connected to a single antenna line placed across the track. However, the electronic methods attempted so far have failed to resolve the problem created when two or more vehicles pass the timing point simultaneously. When this occurs, individual identity is lost and so a number of spotters are employed to ensure the integrity of the timing record.

Accordingly it is an object of this invention to provide an improved timing apparatus which avoids or overcomes the disadvantages of known methods and apparatus.

One broad form of the invention thus provides electronic timing apparatus for determining the time at which specific vehicles pass over a timing line, said apparatus including an electronic transmitter for attachment to each vehicle to be monitored, each transmitter being adapted, in use, to emit a unique identifying signal, a series of separate loop antennas arranged in closely adjacent relationship one to another across the width of a road or track at said timing line to receive a signal from a said transmitter passing thereover, each loop being disposed in a substantially horizontal plane, the width of each loop, that is, the dimension thereof in a direction across said road or track, relative to the width of the vehicles to be monitored, being such that only one said transmitter can pass over a particular loop at the one time whereby the respective signals of a plurality of transmitters passing over said line simultaneously are received in different said loops.

In order that the invention may be more readily understood one particular embodiment will now be described with reference to the accompanying drawings wherein.

Figure 2:
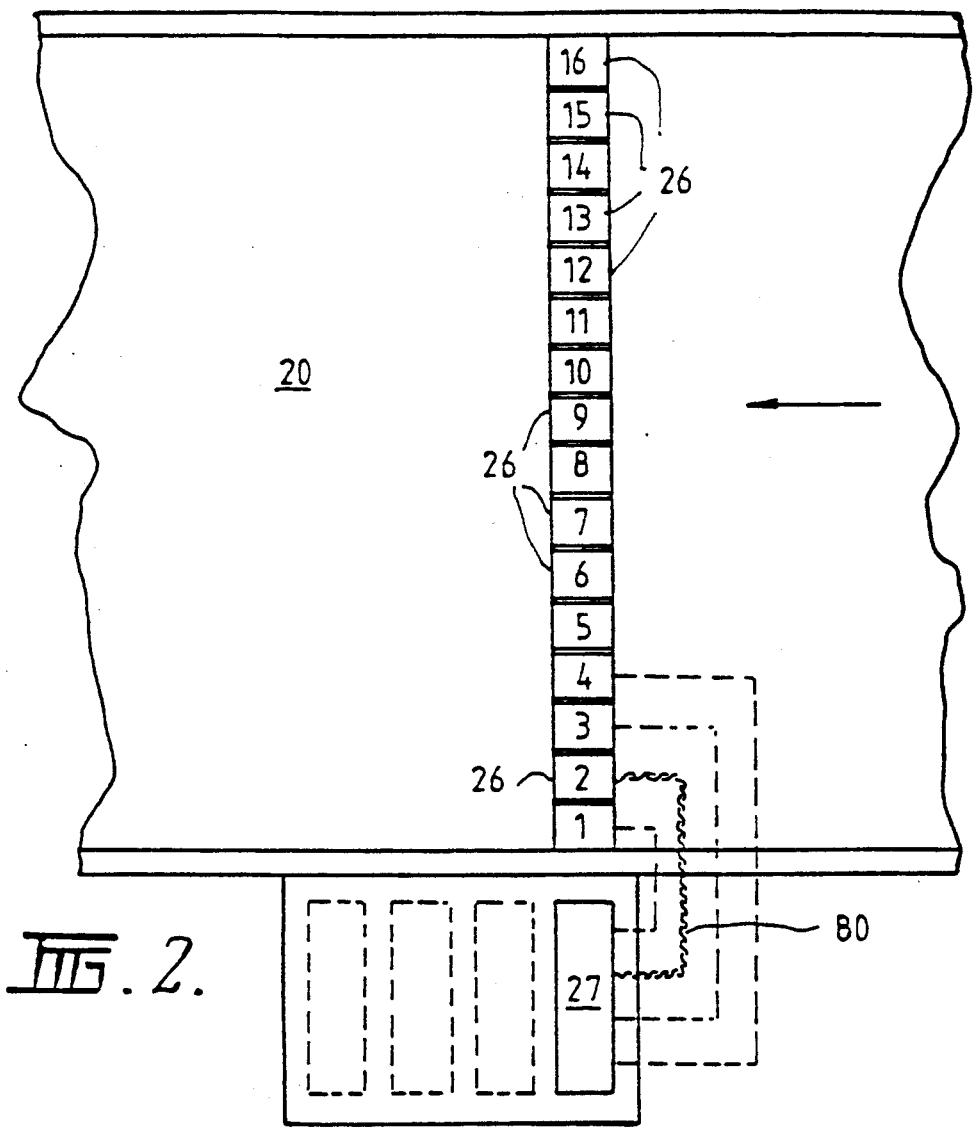
FIG. 2 is a schematic representation of a receiving antenna array and a four module receiver unit according to the embodiment of FIG. 1.
Figure 3:
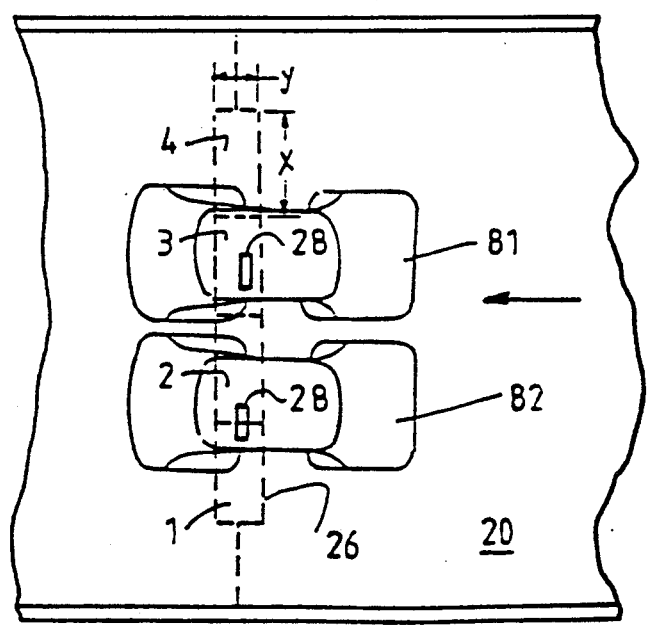
Figure 7:
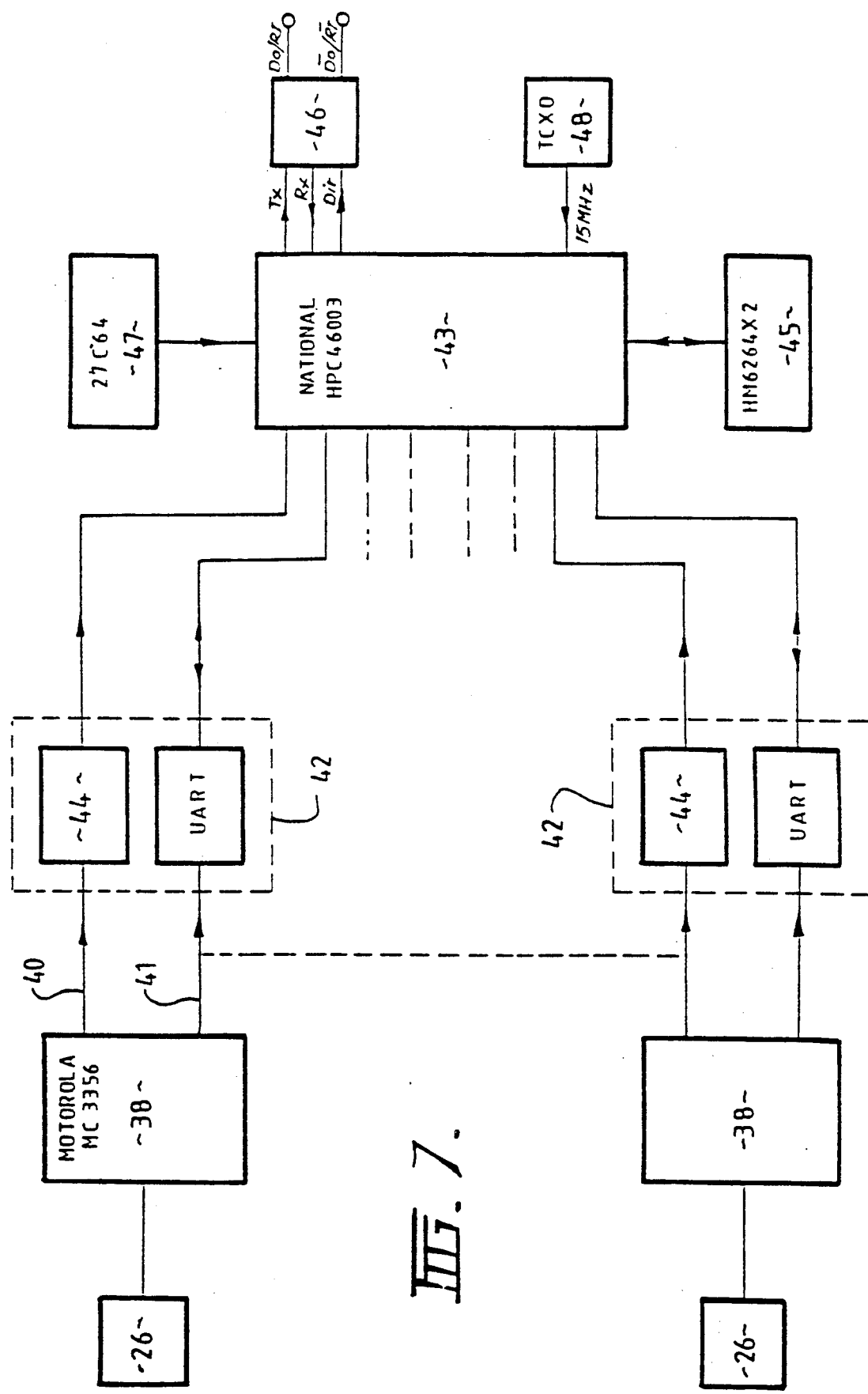

FIG. 3 schematically represents the relationship between width of vehicles being monitored and width of loops in the antenna array of FIG. 2;

FIG. 4 is a graph of signal strength versus time for a transmitter passing over a receiving loop of the antenna array;

FIG. 5 is a block diagram of an electronic transmitter module according to the embodiment;

FIG. 6 is a block diagram of a modified form of transmitter module in which the feature providing facility to readily change the transmitter code number, has been deleted, and;

FIG. 7 is a block diagram of a four loop receiver module according to the embodiment.

Figure 1:
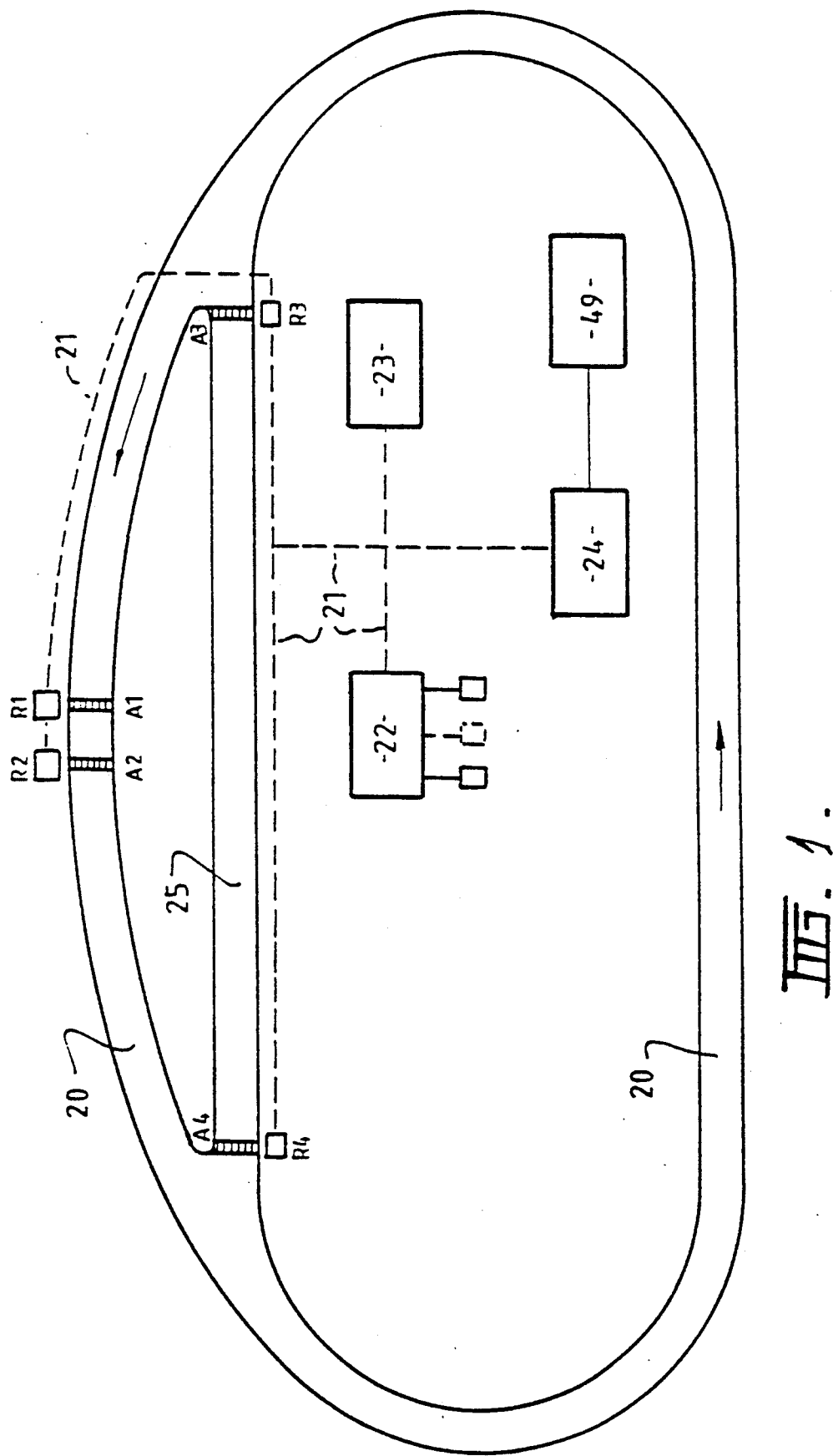
FIG. 1 is a schematic representation of a motor race track showing schematically timing apparatus according to the invention.

The motor race track 20 of FIG. 1 shows the position of 4 antenna arrays A1-A4 with respective receiver modules R1-R4 connected thereto for receiving signals from various loops of the respective antenna array and providing information relevant to the signal to a RS485 data bus 21 which also joins a manual input module 22, real time clock 23, and supervisory and data collection computer (SDCC) 24. The antenna array A1 detects vehicles crossing a start/finish line which co-incides therewith, and antenna array A2 is used to provide data for the calculation of average speed between A1 and A2, in the home straight. The antenna arrays A3 and A4 detect cars entering and leaving a pit area via a pit lane 25 and additional antenna arrays may be added as required.

Referring now to FIG. 2, a typical antenna array is shown in more detail. The antenna array comprises sixteen substantially rectangular and separate loop antennae, placed side by side, across the race track 20. The loops may be inserted in slots cut into the track surface and subsequently resealed or may be placed beneath the track surface before it is constructed. It is also conceivable that the loop antennae may be arranged in a planar flat tape or the like which is placed across the top of the track provided this can be held to the track surface satisfactorily bearing in mind that cars will be passing over it at considerable speed. Each loop 26 is an open loop formed from a single piece of wire, the ends of which are connected to a receiver module as will be described hereinbelow. One particular loop 26 is shown in detail in FIG. 2 whereas the remainder of the loops are represented schematically. It will be noted that the wires 80 extending between a receiver module 27 and a respective loop 26 are twisted together to minimise cross-talk and interference.

Referring now to FIG. 3, there is shown schematically three loop antennae 26 of an antenna array with two motor vehicles 81, 82 side by side passing thereover. Each vehicle or car 81, 82 has a transmitter module 28, represented schematically in FIG. 3, mounted thereon. The position of mounting of the transmitter module 28 is in the same relative position on each car. It will be noted that the width of an antenna loop x, that is, the dimension in a direction across the width of the track 20, relative to the width of a car, is such that with two vehicles adjacent, the signal received in an antenna loop 26 is unmistakably received from a single car. In other words, it is impossible for two cars passing over the antenna array to transmit a valid signal to the same antenna loop.

The manual imput module 22 allows manual input of data relevant to a vehicle crossing the start/finish line in the event of transmitter failure. In other words, if the SDCC 24 establishes that a particular vehicle has not been recorded as passing over the start/finish line within an expected time or shortly thereafter and has not entered the pit lane 25 it may raise an alarm whereby an operator may manually advise the SDCC 24 by means of the module 22 each time the vehicle crosses the start/finish line (assuming of course the vehicle is still circulating).

When a car passes over an antenna array, a signal is received in an antenna loop 26 from the transmitter module 28 mounted on the car. The signal received is typically of the form shown in FIG. 4 which is a graph representing received signal strength (y axis) versus the position of the transmitter antenna, as it passes over the antenna loop 26 (x axis). The points (a), (b), (c) and (d) represent the time at which the signal strength made a transition through a pre-set or "squelch" level 50. The point (e) on the centre line, is calculated from the values of (b) and (c). The leading and trailing ends of the antenna loop are represented by the dots 29 and 30, respectively, in FIG. 4. The signal transmitted to the antenna loop 26 contains an encoded digital signal which is unique to a particular car. The speed of operation of the transmitter module is such that the unique digital signal is transmitted many times during the period in which the vehicle passes over the leading and trailing ends of an antenna loop.

Referring now to FIG. 5, a transmitter module 28 is shown in more detail and is represented by a circuit block diagram. The block diagram is marked with component module numbers insofar as the main circuit components are concerned and this should readily enable a person skilled in the art to understand the construction thereof. The transmitter module 28 employs standard electronic components to transmit an identifying signal comprising a frequency modulated low frequency radio signal representing a particular car number. As mentioned before the signal is transmitted rapidly and at regular intervals such that a larger number of identifying signals are received each time a transmitter module passes over an antenna loop 26. The transmitter module 30 comprises an optional IR receiver 31 connected to a micro-controller 32 of the type indicated. The IR receiver enables inputting of data relevant to a car number and the inputted information is stored in NOVRAM 50. A LED display 33 displays information indicating the car number. The micro-controller 32 executes code stored in ROM 34 and controls the overall operation of the transmitter module. A frequency modulator 35 generates binary FSK (Frequency Shift Keying) signals which are amplified in a power amplifier 36 to drive the transmitter or antenna 37. The transmitter signal is an FSK signal having a frequency of 468.8 KHz for representing logic 0 and 416.7 KHz for representing logic 1. It is the position of the antenna 37 on the motor vehicle which is the relevant consideration since in the embodiment described it is important that the antenna 37 be positioned in the same relative position on each car. According to this embodiment the antenna 37, which is not shown in detail in the drawings, is wound on a ferrite rod having a rectangular section of 15 mm×4 mm and a length of 70 mm. The antenna coil comprises 20 turns of 26 guage wire. It is important for the operation of the apparatus that the axis of the antenna coil, in this case the longitudinal direction of the ferrite rod, extends in the direction of vehicle travel otherwise little signal will be detected in the loops. In an alternative form of the antenna 37 it comprises a printed circuit board wherein the turns of the coil are planar and of a spiral format comprising four or five turns. In the event that the antenna loops 26 are dimensioned smaller in the direction x, the relative positioning of the antenna 37 may become less important. As mentioned above, it is only important that when two vehicles cross the antenna array side by side, the signal from the respective transmitter antennae 37 must be substantially received in different antenna loops 26.

An alternative simplified embodiment of the transmitter unit is shown in FIG. 6. Separate identical batteries 61 and 62 which enable backup for each other via a battery supervisor 63 provide energy and a status signal to power the simplified transmitter. Inputs 71 and 72 respectively provide charge inputs to the batteries 61 and 62. Wire links at 64 are incorporated during manufacture to set an identification number produced by the shift register 65 which with the battery status signal in connection 69 are fed to the FSK modulator 66 as serial data on connection 70. The oscillator 67 provides clock signals for synchronisation of the shift register and FSK modulator functions. The output of the modulator 66 directly drives the closed loop antenna 68.

The transmitter of this alternative embodiment does not have the facility of simple re-programming with a different identity number as with the previously described embodiment. In other words the transmitter is set with its own identity code at the time of manufacture and the SDCC 24 is advised, by keying in information, of the vehicle number on which a transmitter of particular code (identity number) is installed.

FIG. 7 shows a circuit block diagram of a receiver module R which in fact is a four loop receiver module in the sense that it receives signals from four antenna loops 26. Again, the block diagram contains information as to component type numbers so that a person skilled in the art could readily understand the construction and operation of the four loop receiver module. Signals received by an antenna loop 26 are provided to an FM receiver 38 which demodulates the signal and produces a data stream. The FM receiver 38 also produces a squelch signal which may be adjusted to a desired level and produces a digital signal on connection 40 when a signal above the squelch level is received by the FM receiver 38. The signal on 40 and signal on data connection 41 pass to UART 42 which in turn provides parallel digital data to micro-controller 43, where it is filtered to remove spurious data. The data on line 41 represents the car number. Simultaneously, the presence of data, determined by the squelch level signal, is monitored by the change of state detector 44 in the UART and the resulting interrupts cause the micro-controller 43 to read and save 32 bit numbers which represents time, from a free running internal counter. These numbers represent the points (a), (b), (c) and (d) described in relation to FIG. 4. The micro-controller 43 arithmetically calculates the average of points (b) and (c) to determine the centre point (e) which provides a number which after adjustment represents a measure of the actual time of a car passing over the relevant antenna loop. This time number is stored together with the vehicle number and other housekeeping data in a RAM 45 for later transmission on request, via a RS485 interface 46 and data bus to the SDCC 24 (not shown in FIG. 7). The micro-controller 43 operations are derived from code held in ROM 47 and accurate timing is provided by a temperature compensated crystal oscillator 48. The SDCC 24 is able to collate information being received from all the cars passing over the antenna loop, some of which may pass simultaneously, and provide a data base of information. A further information and display computer referred to as a master computer 49 (FIG. 1) receives the information from the SDCC 24 and processes the information for presentation in a format for use and public viewing via a VDU or a network of VDU's (not shown).

It should be readily apparent to persons skilled in the art that the present invention provides a unique and improved apparatus for timing vehicles passing over a line, and is particularly useful for circuit racing where accurate timing is essential. As is evident many antenna arrays may be placed around the track to monitor the progress of vehicles and information concerning lap time, average speed between two antenna arrays, pit stops and the like, may be readily obtained.

The claims defining the invention are as follows:

1. An electronic timing apparatus for determining the time at which specific vehicles (81, 82) pass over a timing line (A1-A4). said apparatus including an electronic transmitter (28) for attachment to each vehicle to be monitored, each transmitter being adapted, in use, to emit a unique identifying signal, characterized in that, a series of separate loop antennas (26) are arranged in closely adjacent relationship one to another across the width of a road or track (20) at said timing line to receive a signal from a said transmitter passing thereover, each loop being disposed in a substantially horizontal plane, the width (x) of each loop in a direction across said road or track, relative to the width of the vehicles to be monitored, being such that only one said transmitter can pass over a particular loop at the one time whereby the respective signals of a plurality of transmitters passing over said line simultaneously are received in different said loops.

2. A timing apparatus as defined in claim 1 characterized in that each vehicle transmitter is provided with a transmitting antenna in the form of a coil type antenna and the respective transmitting antennas are mounted in the same relative position on each vehicle and oriented such that the coil axis extends in the direction of vehicle travel.

3. A timing apparatus as defined in claim 2 characterized in that each said loop is connected to a respective input receiver (R1-R4) for receiving and demodulating a said signal from a particular loop and simultaneously determining when said signal exceeds a predetermined level (50), and a micro-controller (43) is adapted to receive data relevant to the identity of a said vehicle and the exceeding of said predetermined level whereby said micro-controller calculates the time at which said vehicle passed over said timing line.

4. A timing apparatus as defined in claim 3, characterized in that each said loop is of substantially rectangular configuration comprising a single wire formed into an open loop, and leads (80) are connected to the respective ends of the loop, said leads being twisted together and connected to said input receiver.

5. A timing apparatus as defined in claim 4 characterized in that said width of each loop is less than the width of the narrowest said vehicle to be monitored.

6. A timing apparatus as defined in claim 5 characterized in that said predetermined signal level is a squelch level which is chosen such that the signal received from a particular transmitter passing over a loop exceeds the squelch level as the transmitter antenna passes over the leading and trailing ends of the loop and falls below the squelch level therebetween for a time discernible by said micro-controller.

7. A timing apparatus as defined in claim 6 characterized in that said micro-controller arithmetically calculates the average of the time when the signal is below said squelch level, said average being the time when said vehicle crossed said timing line.

8. A timing apparatus as defined in claim 7 characterized in that the spacing (y) between said leading and trailing ends of the loop is sufficient to enable numerous transmissions of said unique identifying signal.

9. A timing apparatus as defined in claim 8 characterized in that said identifying signal is a frequency modulated low frequency radio signal.

10. A timing apparatus as defined in claim 9 characterized in that there is one micro-controller for receiving input from four said input receivers.

11. A timing apparatus as defined in claim 10 characterized in that said micro-controller outputs to a supervisory and data collection computer (24) which processes the timing information into a desired format.

* * * * *